Jan. 23, 1962 H. KELEM 3,017,638
MACHINE FOR TYING CASINGS
Filed April 11, 1960 4 Sheets-Sheet 1
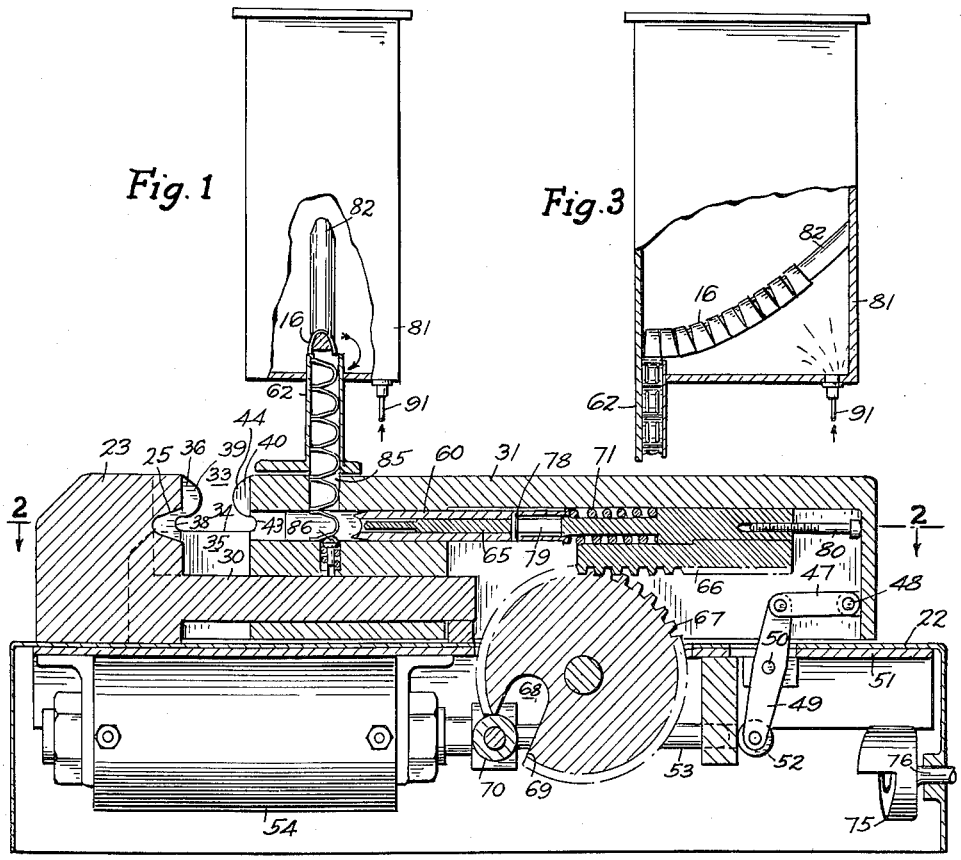
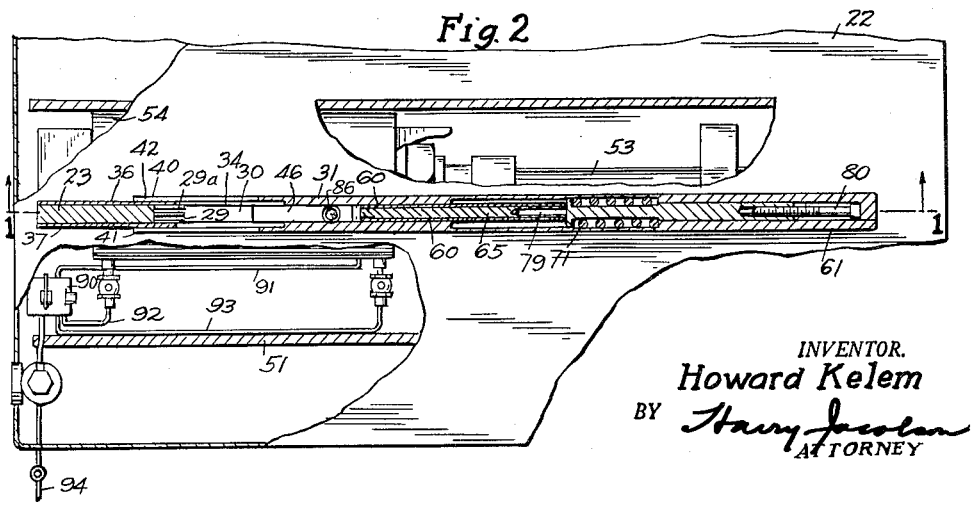
INVENTOR.
Howard Kelem
BY Harry Jacobson
ATTORNEY Jan. 23, 1962  H. KELEM  3,017,638
MACHINE FOR TYING CASINGS
Filed April 11, 1960  4 Sheets-Sheet 2
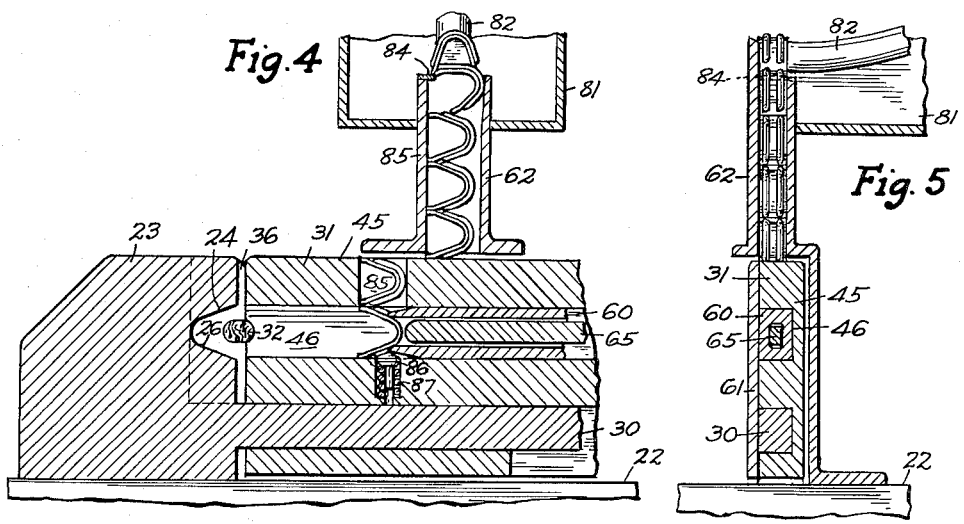
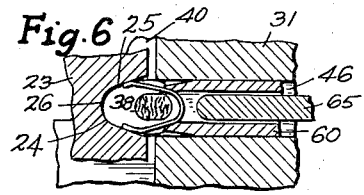
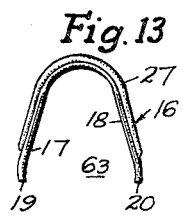
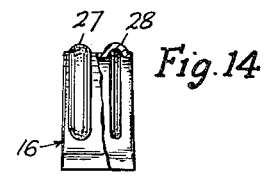
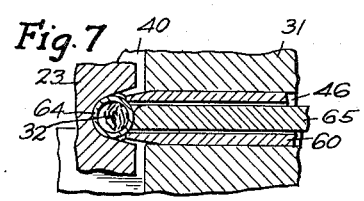
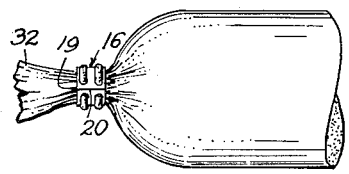
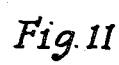
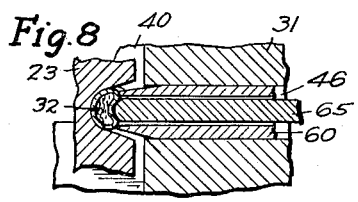
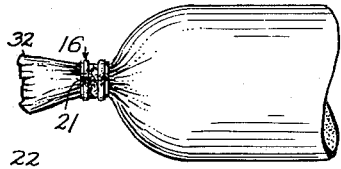
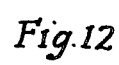
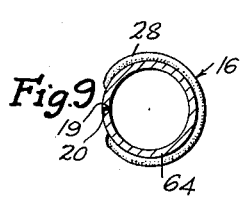
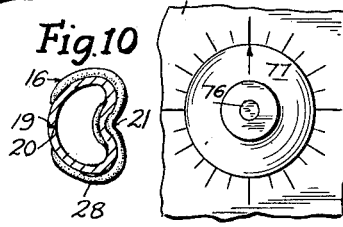
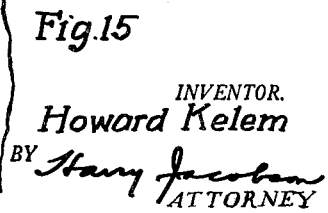
INVENTOR.
Howard Kelem
BY Harry Jacobson
ATTORNEY

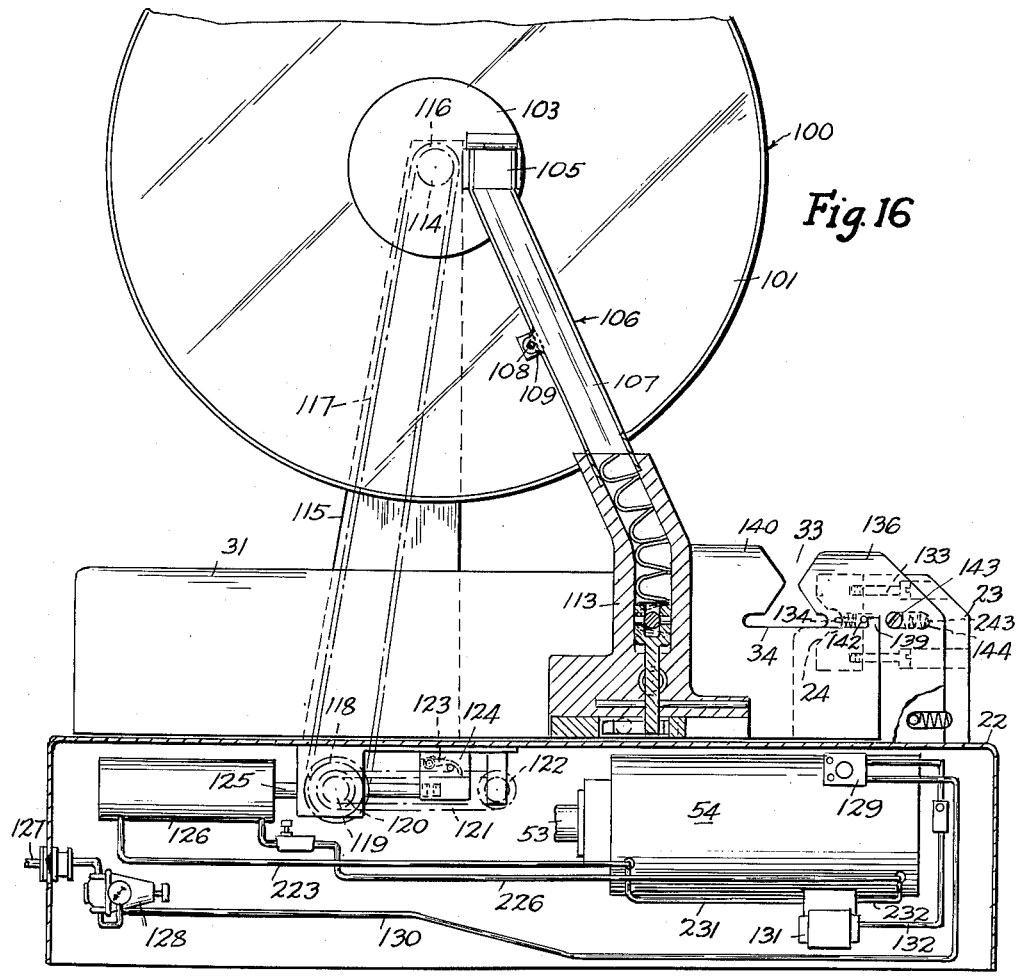

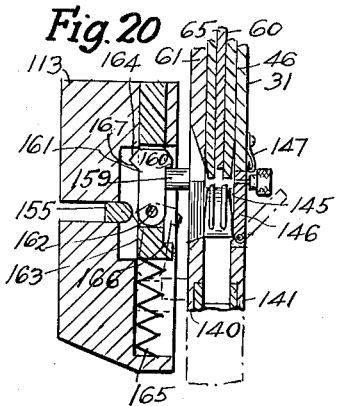
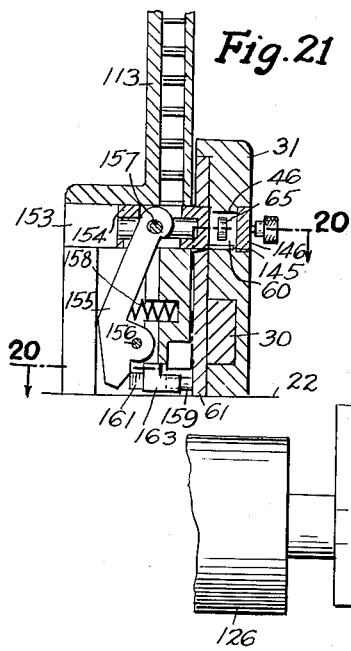
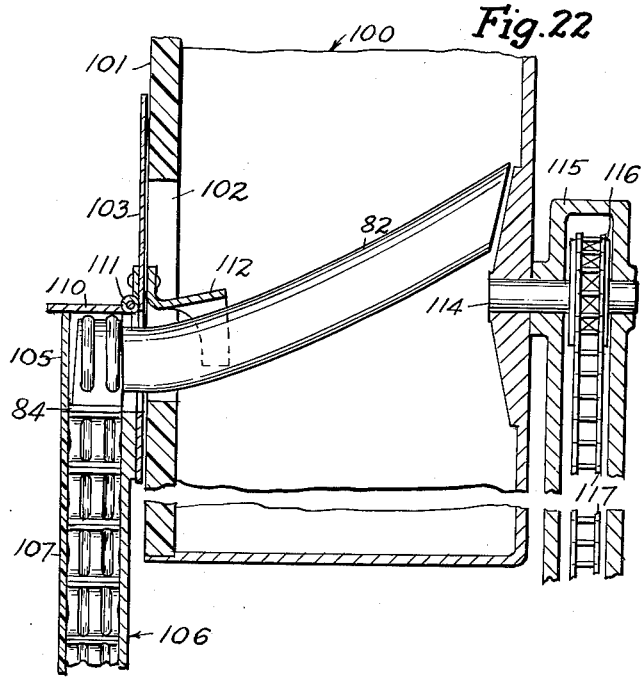
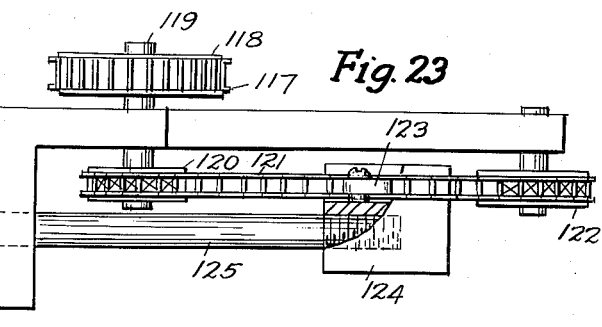
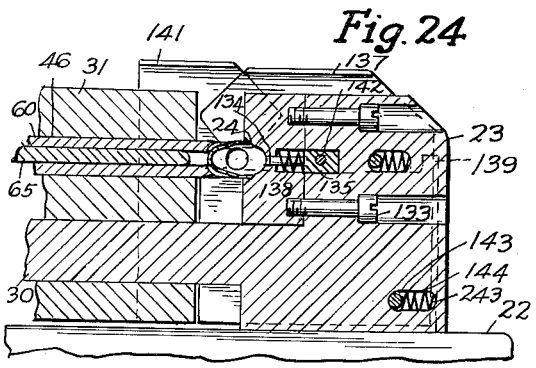

United States Patent Office 3,017,638
Patented Jan. 23, 1962

3,017,638
MACHINE FOR TYING CASINGS
Howard Kelem, Far Rockaway, N.Y. (% Global Industrial Machinery Corp., 415 Beach 72nd St., Arverne 92, N.Y.)
Filed Apr. 11, 1960, Ser. No. 21,481
19 Claims. (Cl. 1—329)

This invention relates to machines for applying a metallic fastener to the otherwise open end of a food holding casing and particularly to that type of machines capable of tying and sealing the twisted or pleated or otherwise gathered end portion of a filled or empty casing.

The invention contemplates the provision of a simple machine adapted to compact an end portion of sheet material casings of various materials, strengths and sizes, to feed automatically initially U-shaped metallic fasteners around and out of contact with the compacted casing end portion, then to bring the squared off end edges of the fastener into pressed fitted contact with each other to form a loose cylindrical ring around said end portion, and finally to indent the fastener to an extent sufficient to effect a permanent seal and to attach the fastener firmly to the casing end portion, thereby to complete the casing tie.

The invention further contemplates the provision of a fastener applying machine wherein the operator need merely supply fasteners to a hopper and insert the compressed or gathered casing end into the machine and operate a handle control to a valve, to seal adequately casings made of a considerable variety of materials and in a considerable range of sizes without danger of damaging casings even of fragile materials such as cellulose, the machine being adjustable to conform to the particular type of casing operated upon.

The invention further contemplates the provision of simple and dependable air operated means for aligning in a row and for feeding fasteners automatically to the setting and indenting means therefor, as well as means for quickly and easily adjusting the depth of the indent formed in the fastener.

The invention further contemplates the provision of simple means for rejecting fasteners which are not properly aligned for driving or which might pile up, thereby avoiding damage to the machine and to the work.

The various objects of the invention will be clear from the description which follows and from the drawings, in which FIG. 1 is a partial elevational view and partial vertical sectional view of the machine taken on the line 1—1 of FIG. 2.

FIG. 2 is a partial sectional view taken on the line 2—2 of FIG. 1 and partial top plan view with parts broken away to expose the underlying structure.

FIG. 3 is a side elevational view of one form of the fastener hopper and feed chute with parts broken away.

FIG. 4 is a fragmentary enlarged sectional view similar to FIG. 1 showing a somewhat advanced position of the driver.

FIG. 5 is a vertical sectional view of FIG. 4.

FIG. 6 is a view similar to FIG. 4 of the driver, indenter and anvil showing the positions of the parts during the compacting of the casing end and the beginning of the setting of the fastener.

FIG. 7 is a similar view showing the fastener end edges brought together and the fastener bent into a ring.

FIG. 8 is a similar view showing the fastener indented.

FIG. 9 is a sectional view of the fastener in the ring-like stage of the application thereof shown in FIG. 7.

FIG. 10 is a similar view of the indented fastener.

FIG. 11 is a fragmentary elevational view of a casing showing the end edges of the fastener.

FIG. 12 is a similar view of the casing tie showing the indent.

FIG. 13 is an elevational view of the preferred form of an initially U-shaped fastener operated on by the machine.

FIG. 14 is a side elevational view thereof partly in section.

FIG. 15 is a fragmentary side elevational view of the dial for indicating the adjustment of the depth of the indent in the fastener made by the machine.

FIG. 16 is a view similar to FIG. 1 of the opposite side of the machine showing a modified form of the hopper and fastener feeding means, air cylinders, the connections thereto and other parts.

FIG. 17 is a fragmentary horizontal sectional view of the fastener driving and feeding means showing the lowermost fastener in the feed chute protruding undesirably out of its proper position and part way into the reciprocating frame.

FIG. 18 is a similar view of the same showing the protruding fastener of FIG. 17 pushed back by the frame into the bottom of the chute.

FIG. 19 is a fragmentary elevational view of the fastener-receiving side opening in the frame communicating with the fastener receiving chamber of the frame.

FIG. 20 is a fragmentary horizontal sectional view of the fastener feeding means taken on the broken line 20—20 of FIG. 21.

FIG. 21 is a vertical sectional view of FIG. 20.

FIG. 22 is a fragmentary vertical sectional view foreshortened, of the hopper of FIG. 16 and of some of the parts for intermittently rotating the hopper.

FIG. 23 is a fragmentary top plan view of the remaining parts for rotating the hopper arranged on the under side of the machine.

FIG. 24 is a fragmentary vertical sectional view similar to FIG. 1 of a modified form of the casing compacting means and the anvil.

The machine is intended to operate preferably on the initially U-shaped ribbed sheet metal fastener 16 (FIGS. 13–14) a supply of which is haphazardly inserted in a pile into a suitable hopper which stacks the fasteners in a chute and feeds them one at a time to a driver. The fastener has spaced apart legs 17 and 18 diverging toward the respective end edges 19 and 20 thereof. Each of said end edges is flat and square and lies in a plane perpendicular to both faces of its leg. As shown in my copending application Ser. No. 755,945 filed August 19, 1958, now Patent No. 2,972,747, issued February 28, 1961, the driver of the machine operates to bring said edges into pressed abutting relation (FIGS. 9 and 10) to form a loose cylindrical ring around and out of contact with the compacted casing end, the ring having substantially uninterrupted continuous inner and outer surfaces across said end edges. All other edges of the fastener, including those of the ribs, are rounded to avoid pressing into, pinching or cutting fragile casing material. After the formation of the ring, the indenter of the machine indents the fastener on the side opposite the abutting end edges. By adjusting the depth of the indent 21 (FIGS. 10 and 12) the machine can operate effectively and safely on casings made of cellulose and other materials which are easily damaged, or made of paper, cloth, polyethylene, fiber or any of the other materials customarily used to hold such food products as fresh or smoked meats including hams, Canadian bacon, or grease including lard, butter, margarine or the like, poultry, cheese, fruit and vegetables.

That form of the machine shown in FIGS. 1–8 will now be described in detail.

On the relatively wide raised platform 22 forming the top of a box-like support, is fixed the anvil support 23 carrying the anvil which has the anvil cavity 24 therein. The cavity has a relatively wide mouth and outwardly converging sides 25 joined by the cylindrical surface 26. To receive the ribs 27, 28 of the fastener 16 during the setting operation, the anvil is provided with upright slots 29, 29a (FIG. 2). A horizontal extension 30 on the anvil support provides a fixed guide on which slides the horizontally reciprocating frame 31.

Cooperating means are provided on the fixed anvil support 23 and the frame 31 to compact the casing end portion 32 and then to advance and bend the fastener. Said end portion as is usual in the sealing or tying of food casings, is first reduced quite substantially in diameter and cross sectional area by gathering, twisting or pleating to partially compress it before it is inserted into the machine. Thereafter it is inserted through the opening 33 to the bottom edge 34 of said opening as formed by the projecting part 35 (FIG. 1) of each of the spaced apart side plates 36, 37 fastened to the opposite parallel faces of the anvil support (FIG. 2). The inner edges of the fixed plates forming the opening 33 each has a lower concave portion 38 and an upper portion 39 overhanging the portion 38 and part of the bottom 34. Cooperating with, and arranged outside of, the relatively fixed plates 36, 37 are the similar parallel spaced movable plates or plate-like extensions 40, 41 on the sliding frame 31. The upper part of the end edge of each plate 40, 41 overhangs the adjacent concave part 43. Forming the lower part of each of the plates 40, 41 and overlapping the projecting part 35 of the adjacent fixed plate, is the forwardly extending projection, the upper horizontal edge 42 of which is coplanar with the bottom 34 of the opening 33 between the fixed and movable plates when said plates are separated.

The upper parts 44 of the movable plates overlap the respective upper parts 39 of the fixed plates 36, 37 in the most forward or advanced position shown in FIGS. 4–8 of the frame 31, while the coplanar edges 34 and 42 at the bottom of the opening 33 form a support of substantial area for the casing end portion. In said advanced position, the concave parts 38 and 43 are brought toward each other with the end portion of the casing therebetween. Said parts compact the casing end along spaced apart circumferential narrow bands and to a slightly lesser extent between the bands, to the required density and maintain the casing end in its compacted condition as best seen in FIG. 6, before the fastener is applied thereto. Such compacting of the casing end permits the fastener to be driven around said end without making contact therewith.

A horizontal groove 46 is made in the relatively thick forward part 45 of the frame 31 in which slides the fastener driver soon to be described, while the frame itself slides on the fixed extension 30 of the anvil support 23. To reciprocate the frame together with its side plates, a link 47 is pivoted at one end 48 to the rear end of the frame (FIG. 1) and is pivoted at its other end to the lever 49 pivoted at 50 to the channel 51 secured to the under face of the platform 22. At its lower end, the lever carries the roller 52 adapted to be engaged by the reciprocating piston rod 53 of the air cylinder 54. As said rod moves rearwardly, it pushes the roller 52 toward the right as viewed in FIG. 1, rotating the lever 49 in a counter clockwise direction and drawing the link 47 and the frame 31 toward the left until the end portion of the piston rod has passed the roller, whereupon the frame is locked in its thus advanced position until the piston rod is retracted. In said position, the casing end portion is compacted and held compacted until the tie is made.

Simultaneously, a fastener is advanced toward the left into a position (FIG. 6) part way around and out of contact with the casing end but ready to be bent completely thereabout into the form of a ring. The advance of the fastener is accomplished by the driver 60 reciprocating horizontally in the groove 46 of and relatively to the frame 31. A suitable cover plate 61 secured to the open side of the frame (FIG. 5) retains the driver in its groove and permits access thereto when removed. The forward or left end of the driver is shaped concavely to fit the arcuate end portion of the fastener and is suitably slotted to receive and to fit the ribs of the fastener deposited by the chute 62 in the groove 46 in front of the driver. Said chute is arranged sufficiently behind the opening 33 to permit said opening to be substantially closed by the overlapping plates 36, 40 and 37, 41 thereby to compact the casing before the fastener reaches the casing end. Since the height of the concave parts 38 and 43 of the plates is less than the least width of the space 63 between the legs 17, 18 of the fastener, the fastener does not touch the casing end until the ends of the fastener legs engage and are bent to a material extent by the converging sides 25 of the anvil cavity 24. During the final part of the advance of the driver, the fastener legs follow the cylindrical surface 26 of the cavity and are bent into corresponding cylindrical form (FIG. 7) with the flat and squared end edges 19 and 20 thereof firmly pressed together and held in tight fitting abutting relation, thereby to provide concentric and substantially continuous and uninterrupted smooth cylindrical inner and outer surfaces on the resulting loose ring 64 around the casing end.

The ring 64 is of course ineffective to maintain the casing end compacted and sealed, for which reason the ring is indented and thereby brought into firmly pressed engagement with the compacted casing end to seal the casing. The means for indenting the ring comprises the indenter 65 mounted for limited reciprocation within and relatively to the driver 60, but reciprocating as a unit therewith prior to the formation of the ring. The indenter is operated by the rack 66 (FIG. 1) secured thereto and meshing with the pinion 67 provided with the non-radial slot 68 therein. Arranged to enter the slot and to engage the edge 69 thereof, is the roller 70 suitably mounted at an intermediate point of the piston rod 53 and rotating the pinion in a counterclockwise direction on the rearward movement of the piston rod. The pinion drives the rack and the indenter forwardly or to the left as viewed in FIG. 1. Through the medium of the spring 71, which is arranged around the indenter and which engages the rear end of the driver 60, said driver is moved toward the left with the indenter as a unit, the spring being strong enough to insure such movement until the fastener is formed into the ring 64 by the driver.

Since the driver moves a greater distance than that required for the compacting of the casing end by the plates of the frame 31, the compacting operation is substantially completed before the ring forming operation, the frame 31, the rack and the pinion moving as required for that purpose. However, after the movements of the frame and driver have been completed and the end edges 19 and 20 of the fastener brought together, the force required to move the driver against the resistance to deformation of the ring 64 is greater than the resistance of the spring 71. Consequently, the indenter continues to move forwardly relatively to the driver and the frame and against said ring, thereby compressing the spring and forming the indent 21 between the ribs of the fastener at a point opposite the abutting end edges 19 and 20.

The depth of the indent depends on the size of the compacted casing end within the loose ring 64. Means are therefore provided to adjust the effective stroke of the indenter to determine such depth. Said means comprises the rotatable cylindrical cam 75 (FIG. 1) on the shaft 76 and serving as a stop to limit the travel of the piston rod rearwardly thereby limiting the forward movement of the indenter into the ring. A visible dial 77 on the extreme end of the shaft 76 (FIG. 15) outside of the frame 22 and a cooperating scale indicate the adjusted position of the cam and the depth of the resulting indent. The maximum movement of the indenter relatively to the driver is determined by the pin 78 (FIG. 1) secured in and arranged transversely of the slot 79 in the indenter and carried by the driver. On the retraction of the piston rod within the air cylinder, the roller 52 is released by the rod to free the lever 49 to rotate in a clockwise direction toward the initial position thereof. The second roller 70 engages the forward edge of the slot 68 of the pinion and rotates the pinion in a clockwise direction until it leaves the slot. During the initial part of the forward movement of the piston rod and the rack, the compressed spring 71 is permitted to expand and to move the indenter toward the right. When the indenter engages the pin 78, the indenter and driver move together until the head of the adjusting screw 80, projecting from the rear end of the indenter, strikes the frame 31. Then the frame moves with the indenter and driver as a unit toward the right until the piston rod is completely retracted or the roller 70 leaves the piston slot. Obviously, movement of the frame swings the lever 49 back into its initial position ready for the repetition of the operation.

An important advantage of the roller-slot operation of the pinion is the increasing pressure on the indenter and on the fastener during the indenting operation. In other words, the deeper the indent, the more pressure is exerted by the indenter to bend the initially arcuate end of the fastener into a reverse curve. Such increasing pressure is attained as the roller moves forwardly and exerts a force horizontally against the edge of the pinion slot, the circumferential component of which force increases until the roller is below the center of the piston.

The means shown in FIGS. 1 and 3-5 for feeding fasteners to the driver will now be described. The fasteners are supplied to the fixed hopper 81 within which is arranged the fixed inclined guide rod 82 adapted to fit the inside surface of the fastener. The fixed upright chute 62 extends upwardly toward the under side of the guide rod, the lower end edge of which is in sufficiently spaced relation to the adjacent hopper wall to permit the lowermost fastener of the row on the rod to slide off the rod into the open top of the chute if otherwise permitted to do so. However, the leading fastener is not permitted to drop directly into the chute. Simple means are provided to force the fastener to turn by gravity into the proper position to be stacked and fed for driving by the driver. As best seen in FIG. 4, said means comprises the plate, lip or projection 84 extending from the wall 85 of the chute and slightly overhanging the top opening of the chute. The lip is of sufficient width to engage and to obstruct the direct fall into the chute of the end edge portion as 19 of the leg as 17 of the leading fastener as the latter leaves the rod 82. As shown in FIG. 4, the other leg 18 of the fastener, being in the open chute and unsupported, falls further into the chute as the fastener pivots about the edge 19 of the leg 17 as a fulcrum on the lip 84. The fastener consequently turns through an angle of about 90° into the position shown wherein its longitudinal axis is horizontal, the temporarily obstructed leg leaving the lip during the turn. The bottom fastener falls out of the chute into the adjacent opening 85 in the frame 31 and into the groove 46 of the frame in front of the retracted driver as shown in FIG. 1.

A yieldable bevelled pin 86 serves to insure the maintenance of the longitudinal axis of the fastener horizontal or parallel to the sides of the groove 46. Said pin is provided with a conical head, which in the retracted or rearward position of the driver (FIG. 1) projects into the groove 46 and into the path of the arcuate end portion of the fastener whereby said portion rests on the apex of the pin head in a proper driving position. As the driver advances to the position shown in FIG. 4, the pin is depressed out of the way against the action of its spring 87 which raises the pin again after the setting operation has been completed and the driver has been retracted to a point behind the pin.

To agitate the fasteners within the hopper so that a sufficient number fall on to and stay on the guide rod, the exhaust blast from the air cylinder is utilized. The exhaust is controlled by the relief port of the four-way valve 90 which port is connected by the pipe 91 (FIG. 2) to the bottom of the hopper. At each reciprocation of the piston of the air cylinder the blast blows the fasteners upwardly and a certain number fall on the guide rod in the positions shown in FIG. 3. Air is supplied to and exhausted from the forward side of the piston through the pipe 92 which is alternately connectable to the support port and to the relief port of the valve 90 by a suitable manually operated handle or lever not shown and operating the valve. Similarly, the pipe 93 alternately connects the rear side of the piston to the supply port and to the relief port, while the pipe 94 supplies air under pressure to the valve 90.

In that form of the machine shown in FIGS. 16-24 and not shown in said application Ser. No. 755,945, means are provided for rotating the hopper intermittently and also for insuring the positive feed of one fastener at a time into driving position in front of the driver, easy access being provided to the row and stack of fasteners should jamming in the chute nevertheless occur. Means are also provided for pushing back into the bottom of the stack, the lowermost fastener should it protrude undesirably, and for automatically ejecting fasteners which might rarely pile on to each other in the driving chamber. A knock-out pin in the anvil and relatively yieldable compacting plates are also disclosed.

Referring now to FIGS. 16 and 22, the hopper 100 is of cylindrical form having a transparent plate 101 preferably of suitable synthetic resin, through which the interior of the hopper and the fasteners therein are visible at all times. A central hole 102 in the plate permits the passage therethrough of the guide rod 82, one end of which, as shown in FIG. 22, is secured to the fixed center plate 103 and chute 106 as by welding along the bottom of the rod for a distance less than the width of the inside of the fastener to permit the fastener to slide through a suitable slot in the center plate and the chute wall off the rod and into the box-like compartment 105 at the top of the chute. Said chute is provided with a readily displaceable transparent wall 107 past which the stack of fasteners is at all times visible and accessible, the wall being held in place loosely by any suitable means such as a clamp passing around the chute or a pin as 108 on which the wall may pivot and which enters a lug 109 on a side wall of the chute. At the top of the chute, the fixed end of the rod 82 passes through the center plate and enters a short distance into the compartment 105 which is open at the bottom except for the fastener-turning lip 84. The lip obstructs the downward movement off the rod of one leg of the leading fastener as has already been described in connection with FIGS. 1 and 2, so that the fastener drops into the chute in the position shown in FIGS. 16 and 22. The top 110 of the compartment 105 is hinged to the center plate 103 as at 111 to permit inspection and manipulation of any fastener which does not turn properly. To make sure that the fasteners do not overlap on the rod, the U-shaped guard 112 which is secured to the center plate, passes through the hole 102 of the hopper plate and restricts the space or passage around the rod 82 to an amount just greater than the cross sectional size of the fastener. Any fastener which might pile up on one already on the rod cannot pass the guard and being unstable, falls back into the hopper. The fasteners stacked in the chute enter the fixed member 113 carrying the mechanism for positively advancing the lowermost fastener into driving position within the frame 31.

To agitate the fasteners sufficiently to replenish the row on the rod, the hopper 100 is rotated intermittently about its supporting shaft 114 journalled in the upstanding bracket 115 and carrying the sprocket wheel 116. The chain 117 engages the wheel 116 and passes downwardly through the platform 22 into engagement with the sprocket wheel 118 on the shaft 119 (FIGS. 16, 22 and 23). On said shaft is also mounted the sprocket wheel 120 operated by the chain 121 which also engages the sprocket wheel 122. A suitable spring pressed pawl 123 is pivoted to a block 124 secured to and reciprocating with the piston rod 125 of the auxiliary air cylinder 126 (FIGS. 16 and 23). The pawl engages the pins of the chain 121 successively and passes thereover on each rearward stroke of the piston rod, and on the forward stroke advances the chain thereby rotating the lower shaft 119 and upper hopper shaft 116 to impart a quick partial turn to the hopper enough to throw the fasteners therein upwardly to a considerable height. Some of the fasteners fall on the rod 82 and are there retained and arranged in a row.

The blast of air supplied to the auxiliary cylinder 126 is the exhaust from the main cylinder 54, the blast alternating in the usual manner to act on opposite sides of the piston and to reciprocate the rod 125. As shown in FIG. 16, air is supplied through the pipe 127 to the regulator valve and gage 128 and enters the pilot valve 129 through the pipe 130. The valve 129 is controlled by a suitable hand operated push rod not shown, which when pressed, admits air to said valve and permits air to enter the main valve 131 through the pipe 132, the pilot valve remaining open throughout the cycle and closing automatically on the completion of the cycle, that is, when the piston of the main cylinder has made a complete forward and backward reciprocation. When sufficient pressure is built up, the piston of the main cylinder is operated by air supplied thereto through the pipe 232 to reciprocate the frame 31 and the parts carried and operated thereby so as to advance and drive a fastener around the casing and to indent the fastener and complete the tie in the manner hereinbefore described. After the driving and indenting stroke of the piston, that port of the main valve leading to the pipe 232 is closed and the port leading to the pipe 231 and to the rear of the piston of the cylinder 54 is opened automatically thereby retracting said piston. Exhaust air from the front of the cylinder 54 enters in front of the piston of the cylinder 126 through the pipe 226 and retracts the pawl 123. On the next cycle, exhaust air from behind the main cylinder piston is lead by the pipe 223 behind the piston of the cylinder 126 and advances the pawl giving the required quick turn to the hopper.

To prevent the driven fastener from sticking in the anvil cavity on the completion of the tie, a suitable knock-out pin 34 is provided as shown in FIGS. 16 and 24. While the anvil is fixed to its support 23 as by the screws 133, the knock-out pin is normally projected into the cavity by the slide 135 to which it is secured, against the action of the spring 138 which urges the pin toward its retracted position out of the anvil cavity. However, on the retraction of the frame 31 into the position shown in FIG. 16, the projections 139 on the compacting plates 140, 141 engage the transverse pin 142 projecting through the slide 135 and through suitable slots in the inner compacting plates 136, 137 and move the slide rearwardly to extend the knock-out pin into the anvil cavity and thereby to eject the casing tie out of the anvil against the action of the spring 138.

The inner compacting plates 136, 137 are shown in FIGS. 16 and 24 as yieldable to avoid damage to the casing due to excessive pressure occasioned by extra large casings or otherwise. Suitable pins as 143 pass through slots as 144 in the anvil support 23 and are fixed at their ends to the inner compacting plates. Springs as 243 urge the pins and the plates rearwardly. Should the fastener be improperly driven or distorted, the plates yield sufficiently to preserve the casing and its contents from injury and to permit the damaged fastener to be removed. Similarly, should one or more fasteners somehow become interlocked or otherwise jammed in the fastener-receiving chamber 145 in the frame in front of the driver, the resulting excessive pressure opens the hinged door 146 in the frame 31 against the action of the strip spring 147 (FIG. 20) so that the damaged fasteners fall out or may be readily removed without damage to the machine.

In order that the fastener be fed into the receiving or driving chamber in its proper position for being driven (FIG. 19) the top wall 148, bottom wall 149, front wall 150 and rear wall 151 of the opening 152 of the cover plate 61 are all bevelled, thereby causing the fastener to be compressed slightly as it is fed into the chamber and insuring a tight frictional sliding fit with the walls of the groove 46 of the frame maintaining the fastener against tilting.

The means for positively feeding the lowermost fastener of the stack in the chute to the receiving chamber 145 is arranged in the member 113 and is operated by the movement of the frame 31. As best seen in FIGS. 20 and 21, the lowermost fastener in the upper part of the member 113 falls into the horizontal passage 153 of said member. The slide 154 reciprocates in said passage and is retracted enough when the frame 31 is in its most forwardly position, to clear the passage for the reception of the bottom fastener. After the frame has moved back and retracted the driver behind the opening 152, the slide 154 advances the fastener into the receiving chamber ready for driving. As shown in FIGS. 17 and 18, should the fastener move only part way into position, or should a second fastener follow that fed into the chamber and move into the opening 152 to protrude from the passage 153, such protruding fastener is pushed back into said passage by the bevelled wall 151 of said opening. As the frame and driver move forwardly to set the fastener, the wall 151 acts as a cam for the purpose mentioned as shown in FIG. 18.

The fastener-advancing slide 154 is operated by the lever 155 pivoted intermediate its ends at 156 to swing in a suitable slot in the member 113, the upper end of the lever being connected to the slide as at 157. For urging the slide into its retracted position behind the fastener, the spring 158 (FIG. 21) is provided. As has been indicated, the lever 155 and slide 154 are operated during the last part of the rearward stroke of the frame 31, at which time the pin 159 at the lower part of the cover plate 61 of the frame engages the shoulder 160 of the lever 161 which is pivoted at 162 to the cam slide 163 to swing in a horizontal plane. The cam slide and lever are thereby drawn rearwardly and cause the inclined cam edge 164 of the lever 161 to engage the lower part of the upright lever 155 and to swing the latter in a clockwise direction as viewed in FIG. 21 thereby to cause the upper slide 154 to advance the fastener into the receiving chamber. After the cam edge passes the lever, the spring 158 becomes effective to return the lever and the upper slide to the initial positions thereof. Movement of the cam slide may be assisted by a suitable compression spring as 165 acting thereon, if desired or found convenient. On the driving or forward stroke of the frame and driver, the lower slide is moved forwardly by the pin 159 acting on the shoulder 166 thereof. Since on such movement, the pin 159 does not engage the lower lever 161, said lever is free to rotate when forced to do so. It is so forced when the inclined edge 167 thereof engages the upright lever 155, which is held at this time in its retracted position by the spring 158. The lower lever therefore passes the upright lever and swings temporarily into the dash-dot line position thereof shown in FIG. 20.

It will now be seen that the machine is simple and reliable, that it is capable of compacting, tying and sealing the crimped end portions of casings of various materials and sizes without danger of damage to the casing, that dangers inherent in jammed or improperly aligned or fed fasteners are minimized and that the intended purposes of the invention have been adequately attained.

While certain specific forms of the invention have herein been shown and described, various obvious changes may be made therein without departing from the spirit of the invention defined by the appended claims.

I claim:

1. In a machine for applying a fastener to a casing, means for compacting the end portion of a casing, means for advancing a U-shaped fastener having legs each ending in a flat edge to a position around and in outward spaced relation to the compacted casing end, a first air-operated means for actuating the casing-compacting means and the fastener-advancing means, a second air-operated means operated by the exhaust from the first air-operated means, a hopper, means actuated by the second air-operated means for rotating the hopper, a chute leading from the hopper to the fastener-advancing means, means in the hopper and extending into the chute for aligning fasteners in a row, means for turning the leading fastener of the row in the hopper about the end edge of one leg as a pivot and for restraining the movement of said one leg as the fastener leaves the aligning means thereby to permit the fastener to turn and to drop by gravity out of the hopper and into the chute in a predetermined position.

2. In a machine for applying a fastener to a casing, means for compacting the end portion of a casing, means for advancing a U-shaped fastener having legs each ending in a flat edge to a position around and in outward spaced relation to the compacted casing end, a fastener hopper, means communicating with the hopper for arranging loose haphazardly disposed fasteners in a row, a second means for advancing the lowermost fastener of the row into position for further advancement by the first-mentioned advancing means, the first-mentioned fastener advancing means including a compressed air cylinder having a reciprocating piston rod and also including a fastener driver carried by and reciprocating with the compacting means, and means responsive to air exhausted from the cylinder for intermittently rotating the hopper.

3. In a machine for applying a fastener to a casing having a reciprocating frame and means for reciprocating the frame, a hopper for independent and loose U-shaped fasteners each having a pair of legs, means for intermittently rotating the hopper controlled by the frame-reciprocating means, a hollow chute extending within the hopper and having a passage therein for the reception of a row of aligned contacting fasteners, means for guiding the fasteners in a row toward the chute, fastener-leg-obstructing means at the top of the chute to engage and halt one leg only of the leading fastener of the row on the guiding means thereby to turn the fastener as the fastener leaves the guiding means and drops into the chute, and means for advancing a fastener from the bottom of the chute and into the frame.

4. In a machine having means for compacting a casing including a reciprocating part, and having means for applying a fastener to the compacted casing, an air cylinder for operating the compacting means, a rotatable hopper for fasteners, means responsive to exhaust air from the air cylinder for rotating the hopper and thereby agitating the fasteners therein, and fastener feeding means including a fixed chute and means movable relatively to the chute and operated by the reciprocating part of the compacting means for advancing a fastener.

5. In a machine for applying a fastener to a casing, a fastener-receiving chamber, means for compacting the end portion of a crimped casing including a bevelled reciprocating part to retract a fastener insufficiently advanced into the chamber, means for arranging haphazardly disposed U-shaped fasteners in a row, means for advancing a fastener from the row into the chamber, and a spring-pressed door normally closing a discharge opening in the chamber and adapted to open to permit the discharge from the machine of malpositioned or deformed fasteners under the pressure of such fasteners in the chamber.

6. The machine of claim 5, the means for advancing a fastener from the row comprising means responsive to movement of the reciprocating part in one direction for moving the fastener transversely of the frame and into the receiving chamber.

7. In a machine for applying a fastener to a fragile casing, a reciprocating frame having a fastener-receiving chamber, a driver slidable in the frame, means for reciprocating the driver together with the frame as well as relatively to the frame and past the chamber in both directions, means for arranging haphazardly disposed loose fasteners in a row including a rotatable hopper, a fastener aligning rod and a chute communicating with the hopper and the rod, means for advancing a fastener from the row into the chamber in a substantially horizontal direction substantially perpendicular to the direction of reciprocation of the frame and in front of the driver, and means on the frame for retracting an insufficiently advanced fastener back from the chamber.

8. In a fastener setting machine having a receiving chamber for a fastener, a hopper for fasteners, means for advancing a fastener from the hopper into the chamber, and means for retracting an insufficiently advanced fastener away from the chamber and back toward the fastener advancing means when the chamber contains a fastener.

9. The machine of claim 8, the fastener advancing means comprising a chute, a member at the bottom of the chute having a passage therein communicating with the chamber and a slide in the passage.

10. In a fastener setting machine having a receiving chamber for a fastener and reciprocating means for advancing the fastener out of the receiving chamber and into a setting position, means for feeding a single fastener at a time into the chamber comprising a chute, a member at the bottom of the chute communicating with the chamber, a slide in the member actuated by the reciprocating means, and fastener-retracting means actuated by the reciprocating means for retracting into the member a second fastener insufficiently advanced by the slide toward the chamber.

11. In a fastener setting machine having reciprocating fastener driving means, means for advancing a fastener into a driving position in front of said driving means comprising a hopper adapted to receive haphazardly arranged fasteners, a fixed guide rod within and projecting from the hopper to arrange the fasteners in a row, a fixed chute at the end of the rod communicating with the hopper, a reciprocating slide adjacent the chute to advance the lowermost fastener in the chute into said driving position, and means controlled by the driving means for rotating the hopper intermittently in one direction.

12. The machine of claim 11, a main air cylinder for operating the driving means and controlling the operation of the hopper-rotating means, the hopper-rotating means being responsive to exhaust air from the air cylinder and being interposed between the hopper and the air cylinder.

13. The machine of claim 11, the hopper-rotating means comprising a main air cylinder having an operative connection to the driving means, an auxiliary air cylinder responsive to exhaust air from the main cylinder, a pawl reciprocated by the auxiliary cylinder, and an operative connection between the pawl and the hopper.

14. The machine of claim 11, and means for turning the fasteners as the fasteners leave the rod and enter the chute.

15. In a fastener setting machine, a hopper for the reception of loose and haphazardly arranged U-shaped fasteners each having a pair of legs, means for intermittently rotating the hopper, a rod in the hopper adapted to be straddled by the fasteners for arranging the fasteners in a row, a chute outside of and communicating with the hopper and adjacent the rod, and means for turning the fasteners successively as the fasteners leave the rod and enter the chute.

16. The machine of claim 15, the turning means comprising fastener-leg-obstructing means at the top of the chute to engage and halt one leg only of the leading fastener of the row on the guiding means.

17. In a fastener setting machine, a reciprocating frame having a fastener-receiving chamber, one wall of the chamber comprising a hinged normally closed spring-pressed door, means for aligning haphazardly disposed fasteners in a row including a rotatable hopper, means for reciprocating the frame and intermittently rotating the hopper, means for advancing the lowermost fastener of the row into the chamber, and means on and responsive to movement of the frame in one direction for retracting an insufficiently advanced fastener, the door of the chamber being adapted to open under the pressure of a distorted fastener in the chamber to discharge said fastener from the chamber.

18. The machine of claim 17, the means for reciprocating the frame comprising a main air-operated cylinder and piston, an opeartive connection between the piston and the frame, and an auxiliary air-operated cylinder and piston having an operative connection to the hopper and responsive to exhaust air from the main cylinder.

19. In a fastener setting machine, a reciprocating frame having a fastener-receiving chamber, a driver reciprocating relatively to and with the frame past the chamber in both directions, an anvil in spaced relation to the chamber and in the path of the driver, means including a hopper for arranging loose U-shaped fasteners in a row, means responsive to movement of the frame for feeding the lowermost fastener of the row in a direction substantially perpendicular to the row and into the chamber while the frame and the driver are being retracted, the driver advancing the fastener from the chamber into the anvil on the opposite stroke of the frame.

References Cited in the file of this patent

UNITED STATES PATENTS

| | | |
|---|---|---|
| 2,265,277 | Gerke | Dec. 9, 1941 |
| 2,733,442 | Russell | Feb. 7, 1956 |
| 2,756,428 | Kellersman | July 31, 1956 |
| 2,907,494 | Ine | Oct. 6, 1959 |